United States Patent
Malwitz

(10) Patent No.: US 12,322,844 B2
(45) Date of Patent: Jun. 3, 2025

(54) WATER GAS SHIFT REACTOR COOLING ASSEMBLY FOR A FUEL CELL SYSTEM

(71) Applicant: FuelCell Energy, Inc., Danbury, CT (US)

(72) Inventor: Jonathan Malwitz, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 18/490,018

(22) Filed: Oct. 19, 2023

(65) Prior Publication Data

US 2024/0136556 A1    Apr. 25, 2024
US 2024/0234770 A9    Jul. 11, 2024

Related U.S. Application Data

(60) Provisional application No. 63/418,103, filed on Oct. 21, 2022.

(51) Int. Cl.

| | |
|---|---|
| *H01M 8/04119* | (2016.01) |
| *H01M 8/0267* | (2016.01) |
| *H01M 8/0612* | (2016.01) |
| *H01M 8/0668* | (2016.01) |
| *H01M 8/14* | (2006.01) |

(52) U.S. Cl.
CPC ....... *H01M 8/0668* (2013.01); *H01M 8/0267* (2013.01); *H01M 8/04141* (2013.01); *H01M 8/0618* (2013.01); *H01M 8/14* (2013.01); *H01M 2008/147* (2013.01)

(58) Field of Classification Search
CPC ............. H01M 8/0668; H01M 8/0267; H01M 8/04141; H01M 8/0618; H01M 8/14; H01M 2008/147; H01M 8/04014; H01M 8/04164; C01B 2203/043; C01B 3/12; Y02E 60/50
USPC ....................................................... 429/412
See application file for complete search history.

(56) References Cited

U.S. PATENT DOCUMENTS

| | | | |
|---|---|---|---|
| 6,423,435 B1 | 7/2002 | Autenrieth et al. | |
| 6,485,853 B1 | 11/2002 | Pettit et al. | |
| 6,585,785 B1 | 7/2003 | Warren et al. | |
| 7,097,925 B2 | 8/2006 | Keefer | |

(Continued)

OTHER PUBLICATIONS

International Search Report and Written Opinion in PCT/US2023/035430 dated Mar. 1, 2024 (9 pages).

*Primary Examiner* — Christian Roldan
(74) *Attorney, Agent, or Firm* — Foley & Lardner LLP

(57) ABSTRACT

A fuel cell system includes a fuel cell module comprising an anode section and a cathode section, a water gas shift reactor (WGSR) configured to receive an anode exhaust stream including carbon monoxide and steam and to output a WGSR exhaust stream comprising carbon dioxide and hydrogen, a condenser configured to receive the WGSR exhaust stream, to condense water in the WGSR exhaust stream, and to output a condensed water stream and a dried gas stream, a gas separation assembly configured to separate the dried gas stream into (i) a carbon dioxide stream comprising carbon dioxide and (ii) an output gas stream, and a cooling vessel coupled to the WGSR. The cooling vessel is configured to receive at least a portion of the condensed water and the carbon dioxide stream, to vaporize the condensed water stream using heat from the WGSR, and to output a humidified carbon dioxide stream.

10 Claims, 3 Drawing Sheets

(56) References Cited

U.S. PATENT DOCUMENTS

| | | |
|---|---|---|
| 7,488,359 B1 | 2/2009 | Sanger |
| 7,553,568 B2 | 6/2009 | Keefer |
| 9,126,831 B2 | 9/2015 | Kale |
| 2002/0090329 A1 | 7/2002 | Ternan |
| 2003/0143448 A1 | 7/2003 | Keefer |
| 2003/0188475 A1 | 10/2003 | Ahmed et al. |
| 2005/0097819 A1 | 5/2005 | Lomax et al. |
| 2005/0106429 A1* | 5/2005 | Keefer ................ H01M 8/0625 429/444 |
| 2006/0251934 A1 | 11/2006 | Valensa et al. |
| 2007/0122667 A1 | 5/2007 | Kelley |
| 2008/0090113 A1 | 4/2008 | Keefer et al. |
| 2008/0179569 A1* | 7/2008 | Clomburg .............. B01J 8/0285 252/373 |
| 2009/0246578 A1 | 10/2009 | Evans et al. |
| 2020/0251755 A1 | 8/2020 | Jahnke |
| 2021/0284530 A1* | 9/2021 | Jahnke ................ H01M 16/003 |

* cited by examiner

WATER GAS SHIFT REACTOR COOLING ASSEMBLY FOR A FUEL CELL SYSTEM

CROSS-REFERENCE TO RELATED PATENT APPLICATION

This application claims the benefit of and priority to U.S. Provisional Application No. 63/418,103, filed on Oct. 21, 2022, which is incorporated by reference herein in its entirety.

BACKGROUND

The present disclosure relates generally to the field of fuel cells, and more particularly to molten carbonate fuel cell systems with exhaust recycle systems.

Generally, a fuel cell includes an anode, a cathode, and an electrolyte layer that together drive chemical reactions to produce electricity. Multiple fuel cells may be arranged in a stack to produce a desired amount of electricity. Molten carbonate fuel cells receive a fuel stream that may comprise methane, hydrogen gas, and, in some cases, carbon monoxide at the anode, and an oxidant stream comprising oxygen and carbon dioxide at the cathode. The oxygen and carbon dioxide form carbonate ions at the cathode, which cross over the electrolyte to the anode. At the anode, the carbonate ions react with the hydrogen to form steam and carbon dioxide.

The anode outputs a stream comprising steam, carbon dioxide, hydrogen, and carbon monoxide. At least a portion of the carbon monoxide may be reacted with the steam to form carbon dioxide and hydrogen via a water gas shift reaction in a water gas shift reactor.

SUMMARY

Systems and methods of the present disclosure relate to fuel cell systems including water gas shift reactors. The water gas shift reactor can be cooled using water condensed from the water gas shift reactor exhaust. The cooling water can be vaporized and used to humidify a carbon dioxide return stream that has been separated from the water gas shift reactor exhaust. The humidified carbon dioxide return stream can be used as an oxidant in the cathodes of the fuel cells. The carbon dioxide output from the water gas shift reactor can thus be recycled, while the vaporized water is mixed with the carbon dioxide to reduce carbon deposition on system components.

One embodiment relates to a fuel cell system, which includes a fuel cell module including an anode section and a cathode section, the anode section configured to output an anode exhaust stream comprising carbon monoxide and steam. The fuel cell system further includes a water gas shift reactor (WGSR) configured to receive the anode exhaust stream and to output a WGSR exhaust stream comprising carbon dioxide and hydrogen. The fuel cell system further includes a condenser configured to receive the WGSR exhaust stream, to condense water in the WGSR exhaust stream, and to output a condensed water stream and a dried gas stream. The fuel cell system further includes a gas separation assembly configured to receive the dried gas stream and to separate the dried gas stream into (i) a carbon dioxide return stream comprising carbon dioxide and (ii) an output gas stream and a cooling vessel coupled to the WGSR. The cooling vessel is configured to receive at least a portion of the condensed water stream and a portion of the carbon dioxide return stream, to vaporize the condensed water stream using heat from the WGSR, and to output a humidified carbon dioxide stream comprising vaporized water and carbon dioxide.

In one aspect of the fuel cell system, which is combinable with any other aspects or embodiments, the cathode section is configured to receive the humidified carbon dioxide stream.

In one aspect of the fuel cell system, which is combinable with any other aspects or embodiments, the gas separation assembly includes a pressure swing adsorption device or an electrochemical hydrogen separator.

In one aspect of the fuel cell system, which is combinable with any other aspects or embodiments, the output gas stream includes hydrogen.

In one aspect of the fuel cell system, which is combinable with any other aspects or embodiments, the gas separation assembly includes a chiller assembly.

In one aspect of the fuel cell system, which is combinable with any other aspects or embodiments, the output gas stream includes carbon dioxide.

In one aspect of the fuel cell system, which is combinable with any other aspects or embodiments, the fuel cell system further includes an anode gas oxidizer configured to receive and oxidize the humidified carbon dioxide stream. The cathode section is configured to receive the oxidized humidified carbon dioxide return stream.

In one aspect of the fuel cell system, which is combinable with any other aspects or embodiments, the anode gas oxidizer is configured to receive an air stream.

In one aspect, which is combinable with any other aspects or embodiments, the fuel cell system further includes a heat exchanger configured to transfer heat from the anode exhaust stream to the humidified carbon dioxide stream.

In one aspect of the fuel cell system, which is combinable with any other aspects or embodiments, the fuel cell module includes molten carbonate fuel cells.

Another embodiment relates to a water gas shift reactor cooling assembly, which includes a water gas shift reactor (WGSR) and a cooling vessel thermally coupled to the water gas shift reactor. The cooling vessel includes a liquid water inlet configured to receive a liquid water stream, a carbon dioxide inlet configured to receive a gas stream comprising carbon dioxide, and a mixing chamber fluidly coupled to the liquid water inlet and the carbon dioxide inlet. The mixing chamber is configured to vaporize the liquid water stream using heat from the water gas shift reactor and to combine the vaporized water and the gas stream.

In one aspect of the WGSR cooling assembly, which is combinable with any other aspects or embodiments, the WGSR is configured to output a WGSR exhaust stream, the liquid water stream comprises liquid water separated from the WGSR exhaust stream, and the gas stream comprises gas separated from the WGSR exhaust stream.

In one aspect of the WGSR cooling assembly, which is combinable with any other aspects or embodiments, the WGSR is configured to output a WGSR exhaust stream, the liquid water stream substantially consists of liquid water separated from the WGSR exhaust stream, and the gas stream substantially consists of gas separated from the WGSR exhaust stream.

In one aspect of the WGSR cooling assembly, which is combinable with any other aspects or embodiments, the cooling vessel includes an outlet configured to output a humidified carbon dioxide stream comprising the combined vaporized water and gas stream.

Another embodiment relates to a method of operating a fuel cell system. The method includes reacting carbon monoxide and steam output from an anode section of a fuel cell module in a water gas shift reactor (WGSR) to generate a WGSR exhaust stream comprising carbon dioxide and hydrogen, condensing water out of the WGSR exhaust stream to generate a condensed water stream and a dried gas stream, separating the dried gas stream into (i) a carbon dioxide return stream including carbon dioxide and (ii) an output gas stream, and vaporizing at least a portion of the condensed water stream to cool the WGSR and humidify the carbon dioxide return stream.

In one aspect of the method, which is combinable with any other aspects or embodiments, the output gas stream includes hydrogen.

In one aspect of the method, which is combinable with any other aspects or embodiments, the output gas stream includes carbon dioxide.

In one aspect, which is combinable with any other aspects or embodiments, the method further includes oxidizing the humidified carbon dioxide return stream and directing the oxidized humidified carbon dioxide return stream to a cathode section of the fuel cell module.

In one aspect, which is combinable with any other aspects or embodiments, the method further includes transferring heat from the carbon monoxide and steam to the humidified carbon dioxide return stream.

In one aspect of the method, which is combinable with any other aspects or embodiments, the fuel cell module includes a molten carbonate fuel cell.

It will be appreciated that these and other aspects and/or features may be used in any combination.

Figure 1:
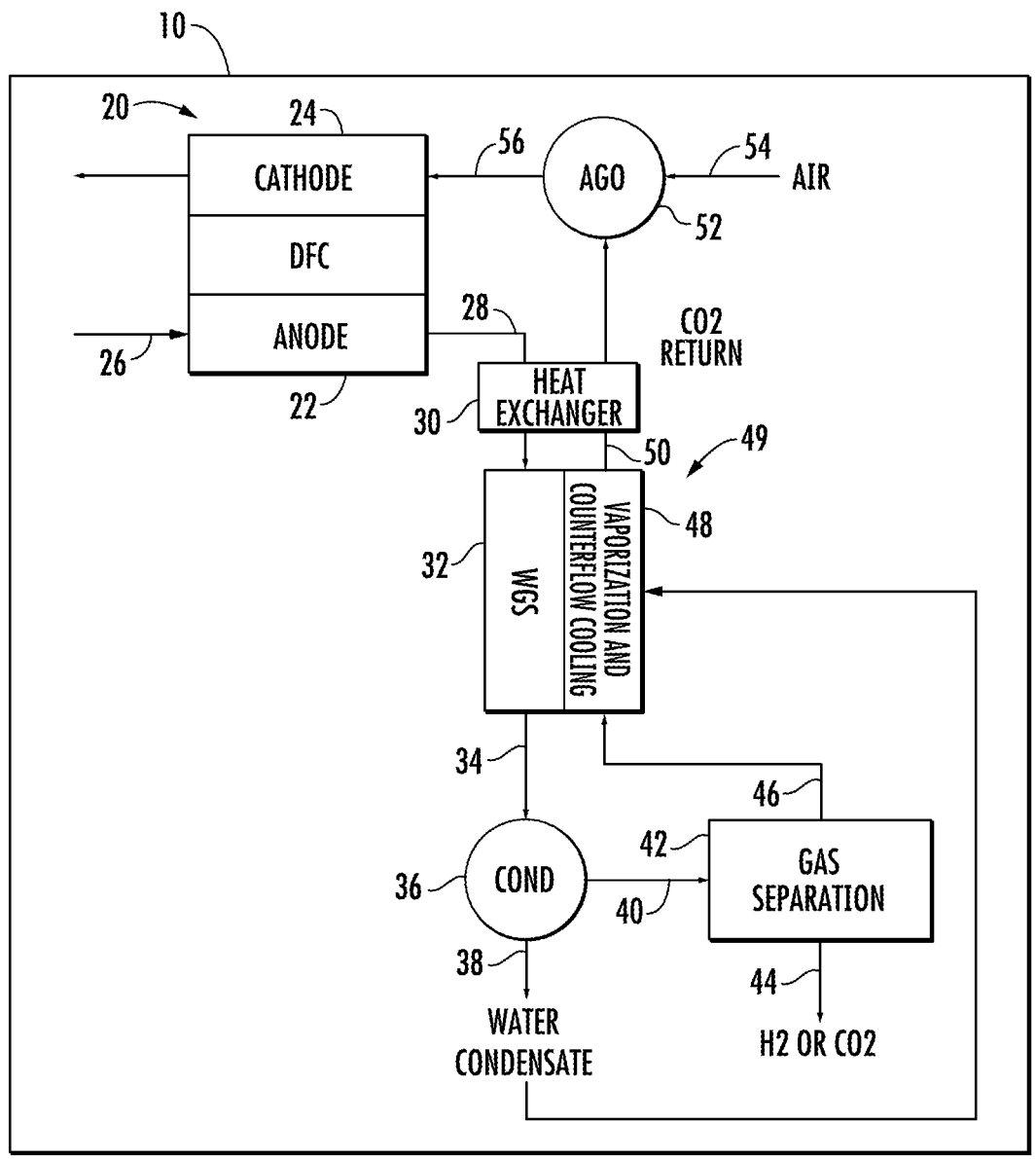
FIG. 1 is a schematic diagram of a fuel cell system according to an exemplary embodiment.

It will be recognized that the Figures are schematic representations for purposes of illustration. The Figures are provided for the purpose of illustrating one or more implementations with the explicit understanding that the Figures will not be used to limit the scope of the meaning of the claims.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In molten carbonate fuel cell systems, a water gas shift reactor may receive an anode exhaust stream comprising steam, carbon monoxide, carbon dioxide, hydrogen, and in some cases, hydrocarbons. In order to recycle the anode exhaust stream back to the fuel cell, it is preferable to remove the carbon monoxide. The anode exhaust may be directed to a water gas shift reactor (WGSR) in which the carbon monoxide reacts with the steam in a water gas shift reaction to produce a WGSR exhaust stream comprising carbon dioxide and hydrogen. This is an exothermic reaction that generates heat in the WGSR. A reverse, endothermic reaction, in which carbon dioxide reacts with hydrogen to form water and carbon monoxide, can also take place in the WGSR. At higher temperatures, the reverse reaction rate increases relative to the water gas shift reaction, and the carbon dioxide concentration in the WGSR exhaust stream increases. Accordingly, it is advantageous to cool the WGSR to keep carbon monoxide levels low. Additionally, water in the WGSR exhaust stream may be condensed and removed in a condenser, and the carbon dioxide and hydrogen may be reused in the system. However, dry reformate streams containing carbon dioxide streams may deposit solid carbon on pipes and other surfaces, especially on nickel pipes in heat exchangers. This can cause buildup in the pipes, reducing the internal diameter and increasing upstream pressure in the system. Accordingly, it is advantageous to humidify gas streams comprising carbon dioxide in the fuel cell system.

Referring to FIG. 1, a fuel cell system 10 according to an exemplary embodiment is shown. The fuel cell system 10 includes a fuel cell module 20. The fuel cell module 20 includes one or more fuel cells arranged in one or more fuel cell stacks. The fuel cell module 20 includes an anode section 22 and a cathode section 24. Each fuel cell in the fuel cell module 20 includes an electrolyte sandwiched between an anode and a cathode. The fuel cells may be, for example, molten carbonate fuel cells. Fuel, such as hydrogen or hydrocarbon fuel, is fed to the anodes of the fuel cells via fuel inlet stream 26, while oxidant is fed to the cathodes of the fuel cells via fuel inlet stream 26. An anode exhaust stream 28 containing steam, carbon monoxide, carbon dioxide, hydrogen, and in some cases, hydrocarbons is exhausted from the anode section 22. The anode exhaust stream 28 is cooled by a heat exchanger 30 and directed into a WGSR 32.

In the WGSR 32, the carbon monoxide and steam in the anode exhaust stream 28 reacts to form carbon dioxide and hydrogen according to the reaction:

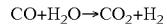

$$CO + H_2O \rightarrow CO_2 + H_2$$

so that the WGSR 32 outputs a WGSR exhaust stream 34 comprising primarily carbon dioxide, hydrogen, and steam. For example, 80 percent, 90 percent, or more of the carbon monoxide may be removed due to the reactions in the WGSR 32. The WGSR exhaust stream 34 may also include trace amounts of argon, methane, nitrogen, and other hydrocarbons. The WGSR exhaust stream 34 is then conveyed to the water removal assembly 36, which may include a condenser. Water present in WGSR exhaust stream 34 is separated from the remaining gases, such as carbon dioxide and hydrogen, in the water removal assembly 36, for example, via condensation of steam. The water removal assembly 36 outputs a condensed water stream 38 and a dried gas stream 40 comprising hydrogen and carbon dioxide.

The dried gas stream 40 is directed to a gas separation assembly 42 where the hydrogen and carbon dioxide in the dried gas stream 40 are separated. The gas separation assembly 42 may include, for example, a condenser configured to liquefy a portion of the carbon dioxide out of the dried gas stream 40. Additionally or alternatively, the gas separation assembly 42 may include a pressure swing adsorption device or an electrochemical hydrogen separator configured to separate a portion of the hydrogen from the dried gas stream 40. The separated hydrogen or carbon dioxide may be output via an output gas stream 44 and used for various purposes in the fuel cell system 10 or other industrial processes or may be stored for later use. The residual gases, including at least a portion of the carbon dioxide and at least a portion of the hydrogen, are output via the carbon dioxide return stream 46 (e.g., a first gas stream comprising carbon dioxide). In embodiments in which the output gas stream 44 comprises mainly hydrogen, the carbon dioxide return stream 46 may comprise mainly carbon dioxide. In embodiments in which the output gas stream 44 comprises mainly carbon dioxide, the carbon dioxide return stream 46 may comprise mainly hydrogen. However, in either case, the carbon dioxide return stream 46 comprises carbon dioxide and hydrogen.

The condensed water stream 38 is directed back to a cooling vessel 48 (e.g., a heat exchanger) coupled to the WGSR 32. The cooling vessel 48 is thermally coupled to the WGSR 32 such that the liquid water in the condensed water stream 38 is vaporized from the heat generated by the water gas shift reaction in the WGSR 32. The heat of vaporization cools the WGSR 32 to a temperature at which the water gas shift reaction dominates over the reverse reaction so that most (e.g., 80 percent, 90 percent, or more) of the carbon monoxide in the anode exhaust stream 28 is removed. If the WGSR 32 is not cooled, it may begin to operate at temperatures that increase the reverse reaction rate, resulting in increased levels of carbon monoxide in the WGSR exhaust stream 34. The carbon dioxide return stream 46 is also directed into the cooling vessel 48 to provide additional counterflow cooling.

Figure 2:
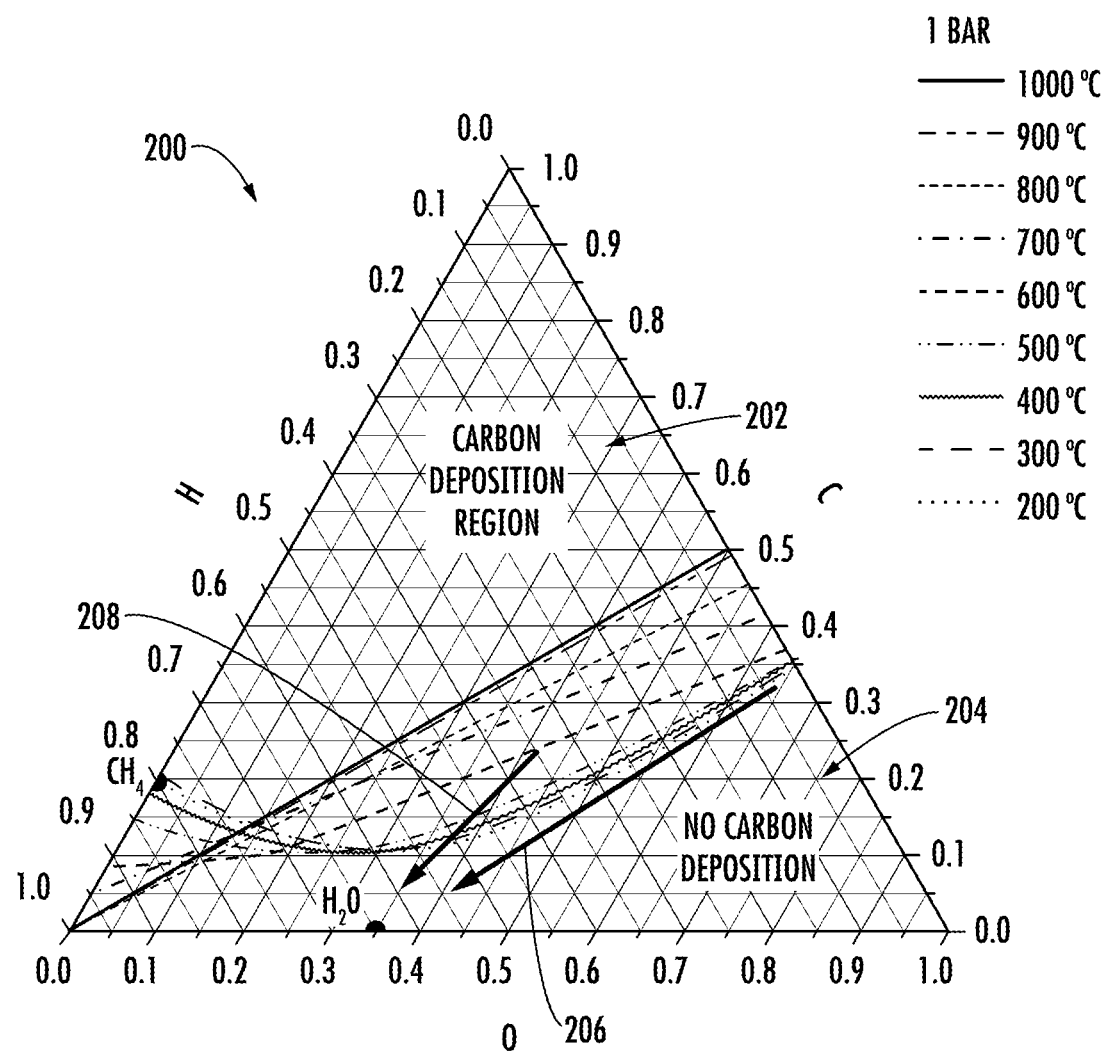
FIG. 2 is a ternary diagram identifying the likelihood of carbon deposition of a gas stream comprising various ratios of carbon, hydrogen, and oxygen.

Referring now to FIG. 2, a ternary diagram 200 illustrating the relative carbon deposition rates of gas mixtures containing carbon, hydrogen, and oxygen at different temperatures is shown. Carbon deposited on the inner surfaces of pipes, heat exchangers, and other system components can build up to levels that require replacement of the components. For example, carbon buildup in a pipe can reduce the inner diameter of the pipe, affecting flow rates and upstream and downstream pressure and reducing the efficiency and power output of the fuel cell system 10. Carbon is more likely to be deposited in the carbon-forming region 202 and less likely to be deposited in the carbon-free region 204. Adding steam to a carbon dioxide stream moves the mixture closer to the carbon-free region 204, as indicated by the arrow 206. Adding steam has a similar effect on a mixed stream comprising hydrogen, carbon dioxide, and carbon monoxide, as indicated by arrow 208.

Referring again to FIG. 1, in the cooling vessel 48, the steam generated from vaporizing the liquid water in the condensed water stream 38 mixes with the carbon dioxide in the carbon dioxide return stream 46 (e.g., the first gas stream). This mixture is output from the cooling vessel 48 as a humidified carbon dioxide stream 50. Adding steam to the carbon dioxide return stream 46 moves the gas further from the carbon-forming region 202 shown in FIG. 2 and closer to the carbon-free region 204. The reduced level of carbon deposition due to the added steam in the humidified carbon dioxide stream 50 can extend the life of system components. In some embodiments, additional gas (e.g., a mixture containing carbon dioxide and/or hydrogen) from another source may be supplied to the cooling vessel 48 along with the carbon dioxide return stream 46. Similarly, in some embodiments, additional water may be supplied to the cooling vessel 48 along with the condensed water stream 38.

The humidified carbon dioxide stream 50 is directed to the heat exchanger 30 where it absorbs additional heat from the anode exhaust stream 28. The heated humidified carbon dioxide stream 50 is then directed to an anode gas oxidizer 52. An air stream 54 is also directed to the anode gas oxidizer 52. In the anode gas oxidizer 52, residual hydrogen, carbon monoxide, and methane from the humidified carbon dioxide stream 50 are oxidized by burning, forming additional carbon dioxide. The oxidized gas output by the anode gas oxidizer 52 is input into the cathode section 24 of the fuel cell module 20 via oxidant input stream 56.

The WGSR 32 and the cooling vessel 48 may be collectively described as a water gas shift reactor cooling assembly 49. The cooling vessel 48 includes a liquid water inlet configured to receive the condensed water stream 38 and a carbon dioxide return inlet configured to receive the carbon dioxide return stream 46. The cooling vessel 48 includes a mixing chamber fluidly coupled to the liquid water inlet and the carbon dioxide return inlet and is configured to vaporize the liquid water using heat from the WGSR 32 and to combine the vaporized water and carbon dioxide return stream 46. The condensed water stream 38 and carbon dioxide return stream 46 are components separated from the WGSR exhaust stream 34. In some embodiments, a portion of the condensed water stream 38 may be used elsewhere in the fuel cell system 10 or removed from the system 10 entirely. For example, between 5% and 15% of the condensed water stream 38 may be used to cool the WGSR 32 and humidify the carbon dioxide return stream 46 and between 85% and 95% of the condensed water stream 38 may be used elsewhere in the fuel cell system 10 or removed from the system 10. The cooling vessel 48 may include an outlet configured to output a humidified carbon dioxide stream 50 comprising vaporized water and carbon dioxide.

Figure 3:
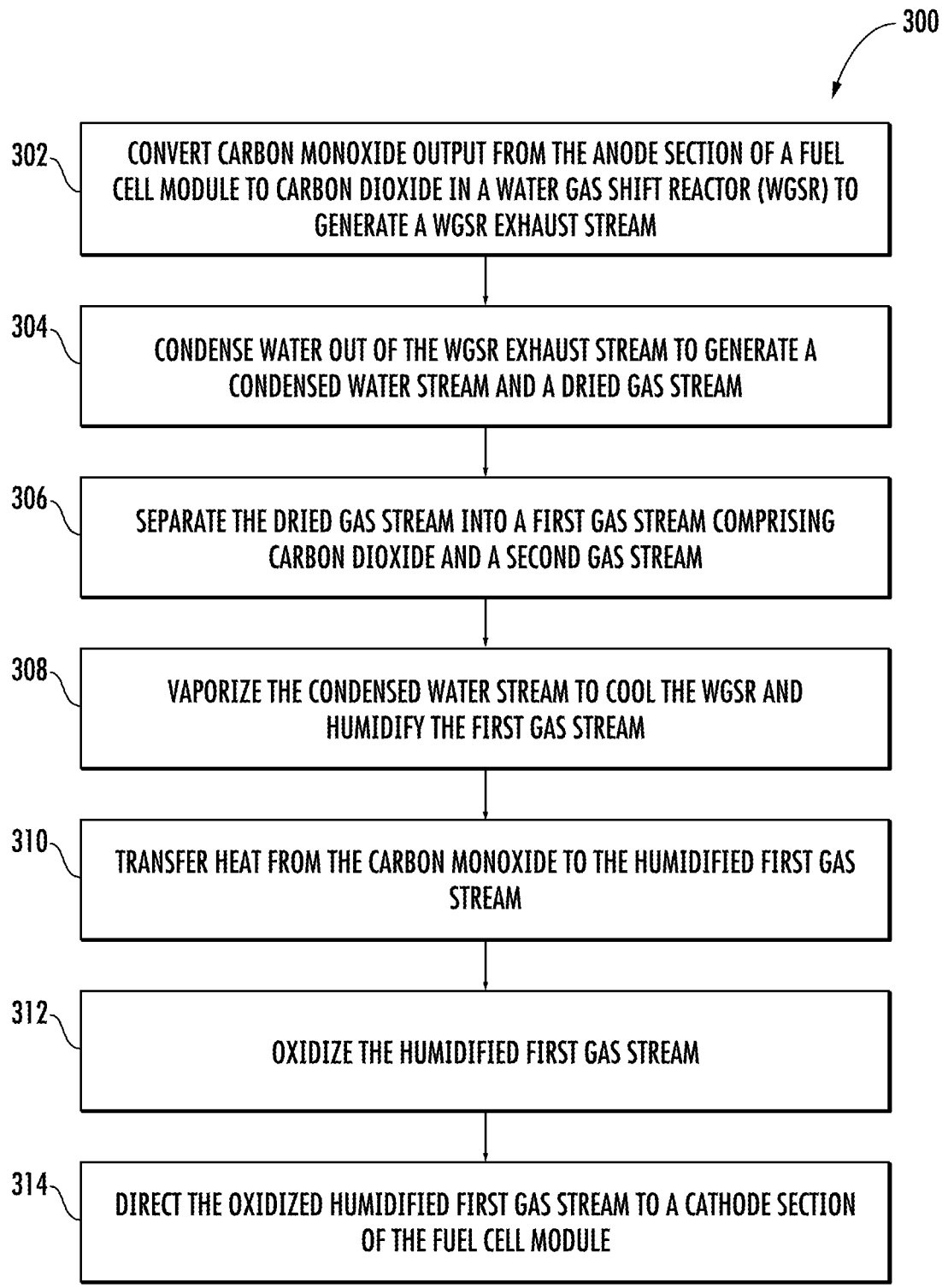
FIG. 3 is a flow diagram of a method of operating a fuel cell system, according to an exemplary embodiment.

FIG. 3 illustrates a process 300 (e.g., a method) of operating a fuel cell system (e.g., fuel cell system 10), according to an exemplary embodiment. The process 300 begins at operation 302 with the reaction of carbon monoxide and steam output from the anode section of a fuel cell module in a water gas shift reactor (WGSR) to generate a WGSR exhaust stream comprising carbon dioxide and hydrogen. For example, in fuel cell system 10, the WGSR 32 receives an anode exhaust stream 28 from the anode section 22 of the fuel cell module 20, the carbon monoxide and steam in the anode exhaust stream 28 react to form carbon dioxide and hydrogen, and the WGSR 32 outputs a WGSR exhaust stream 34 including the carbon dioxide and hydrogen. At operation 304, the water is condensed out of the WGSR exhaust stream to generate a condensed water stream and a dried gas stream. For example, in fuel cell system 10, water removal assembly 36 is configured to separate the WGSR exhaust stream 34 into a condensed water stream 38 and a dried gas stream 40. At operation 306, the dried gas stream is separated into a first gas stream comprising carbon dioxide and an output gas stream. For example, in fuel cell system 10, gas separation assembly 42 is configured to separate the dried gas stream 40 into a carbon dioxide return stream 46 comprising carbon dioxide and the output gas stream 44, which may comprise carbon dioxide or hydrogen.

At operation 308, the condensed water stream is vaporized to cool the WGSR and humidify the first gas stream. For example, in fuel cell system 10, the condensed water stream 38 is vaporized in the cooling vessel 48 using heat from the WGSR 32, and the steam generated is used to humidify the carbon dioxide return stream 46. At operation 310, heat is transferred from the carbon monoxide to the humidified first gas stream. For example, in fuel cell system 10, heat is transferred from the anode exhaust stream 28 to the humidified carbon dioxide stream 50 in the heat exchanger 30. At operation 312, the humidified first gas stream is oxidized. For example, in fuel cell system 10, the humidified carbon dioxide stream 50 is oxidized in the anode gas oxidizer 52 by burning residual hydrocarbons, hydrogen, and carbon monoxide in the humidified carbon dioxide stream 50. At operation 314, the oxidized humidified first gas stream is directed to the cathode section of the fuel cell module. For example, in fuel cell system 10, the anode gas oxidizer 52 outputs an oxidant input stream 56 into the cathode section 24 of the fuel cell module 20.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

Although the figures and description may illustrate a specific order of method steps, the order of such steps may differ from what is depicted and described, unless specified differently above. In some embodiments, methods may include additional steps or may omit recited steps. Also, two or more steps may be performed concurrently or with partial concurrence, unless specified differently above.

What is claimed is:

1. A fuel cell system comprising:
   a fuel cell module comprising an anode section and a cathode section, the anode section configured to output an anode exhaust stream comprising carbon monoxide and steam;
   a water gas shift reactor (WGSR) configured to receive the anode exhaust stream and to output a WGSR exhaust stream comprising carbon dioxide and hydrogen;
   a condenser configured to receive the WGSR exhaust stream, to condense water in the WGSR exhaust stream, and to output a condensed water stream and a dried gas stream;
   a gas separation assembly configured to receive the dried gas stream and to separate the dried gas stream into (i) a carbon dioxide return stream comprising carbon dioxide and (ii) an output gas stream; and
   a cooling vessel coupled to the WGSR, the cooling vessel configured to receive at least a portion of the condensed water stream and a portion of the carbon dioxide return stream, to vaporize the condensed water stream using heat from the WGSR, and to output a humidified carbon dioxide stream comprising vaporized water and carbon dioxide.

2. The fuel cell system of claim 1, wherein the cathode section is configured to receive the humidified carbon dioxide stream.

3. The fuel cell system of claim 1, wherein the gas separation assembly comprises a pressure swing adsorption device or an electrochemical hydrogen separator.

4. The fuel cell system of claim 3, wherein the output gas stream comprises hydrogen.

5. The fuel cell system of claim 1, wherein the gas separation assembly comprises a chiller assembly.

6. The fuel cell system of claim 5, wherein the output gas stream comprises carbon dioxide.

7. The fuel cell system of claim 1, further comprising an anode gas oxidizer configured to receive and oxidize the humidified carbon dioxide stream, wherein the cathode section is configured to receive the oxidized humidified carbon dioxide return stream.

8. The fuel cell system of claim 7, wherein the anode gas oxidizer is configured to receive an air stream.

9. The fuel cell system of claim 1, further comprising a heat exchanger configured to transfer heat from the anode exhaust stream to the humidified carbon dioxide stream.

10. The fuel cell system of claim 1, wherein the fuel cell module comprises molten carbonate fuel cells.

* * * * *